(12) United States Patent
Hirai (10) Patent No.: US 6,413,597 B1
(45) Date of Patent: Jul. 2, 2002

(54) RESIN BAG AND MANUFACTURING METHOD THEREOF

(75) Inventor: Kinji Hirai, Kanagawa (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/499,670

(22) Filed: Feb. 8, 2000

Related U.S. Application Data (62) Division of application No. 09/046,612, filed on Mar. 24, 1998, now Pat. No. 6,044,629.

(30) Foreign Application Priority Data

Mar. 26, 1997 (JP) ................................................. 9-73470

(51) Int. Cl.$^7$ .......................... B65D 33/02; B60R 21/16
(52) U.S. Cl. .................... 428/35.2; 428/35.5; 428/178; 428/338; 428/339; 383/105; 383/119; 280/728.1; 280/743.1
(58) Field of Search .............................. 428/35.2, 35.5, 428/35.7, 178, 338, 339; 383/105, 119, 109; 280/728.1, 743.1

(56) References Cited

U.S. PATENT DOCUMENTS

| | | | | |
|---|---|---|---|---|
| 5,549,944 A | * | 8/1996 | Abate | 428/35.2 |
| 5,554,423 A | * | 9/1996 | Abate | 428/35.2 |
| 5,904,425 A | * | 5/1999 | May | 383/203 |
| 6,044,629 A | * | 4/2000 | Hirai | 53/561 |

* cited by examiner

Primary Examiner—Rena L. Dye
(74) Attorney, Agent, or Firm—Kanesaka & Takeuchi (57) ABSTRACT

A method of manufacturing a resin bag whereby the peripheral edge of the bag such as a resin air baa is not bulky, the bonding strength is still sufficient, and the productivity is increased, is provided. A first resin sheet 1 and a heat-resisting sheet 3 are overlaid on each other and are disposed in a cavity 13 of a mold 7. The diameter of the heat-resisting sheet 3 is smaller than that of the first resin sheet 1 so that a portion of the sheet 1 is exposed outside the heat-resisting sheet 3. After injecting resin 2' into the cavity 13 through a sprue bush end 12, the resin 2'is pressed and expanded to mold a second resin sheet 2 and bond the sheet 2 to the sheet 1 at the peripheries thereof.

5 Claims, 8 Drawing Sheets

FIG. 8b

RESIN BAG AND MANUFACTURING METHOD THEREOF

CROSS REFERENCE TO RELATED APPLICATION

This is a divisional application of Ser. No. 09/046,612 filed on Mar. 24, 1998 now U.S. Pat. No. 6,044,629.

FIELD OF THE INVENTION

The present invention relates to a bag including an air bag, a water pillow, a cover, a float, and a life buoy, which is made of a resin sheet or film.

BACKGROUND OF THE INVENTION

Among such types of bags, an air bag for use in restraining a vehicle occupant during collision has been typically made of woven fabric of fiber such as polyamide fiber with silicone rubber coating. As alternatives, an air bag made of heat-resisting resin sheet (JPA No. 2-31965) and an air bag made of elastomer (JPA No. 4-266544) were recently proposed.

Such heat-resisting resin sheets or elastomer sheets are cut out in desired sizes from a large sheet and then bonded together by adhesives or fusion.

The method of cutting out the sheets in desired sizes from the large sheet takes a lot of time, thereby lowering the productivity.

When the resin sheets are bonded together by adhesive or fusion defective bonded portions may be formed because of bulkiness and irregularity of the sheets.

OBJECT AND SUMMARY OF THE INVENTION

It is an object of the present invention to provide a method of manufacturing a resin bag, whereby the peripheral edge of the bag such as a resin air bag is not bulky, the bonding strength is still sufficient, and the productivity is increased.

It is another object of the present invention to provide a resin bag which can be quickly inflated when a gas is supplied inside the bag.

A method of manufacturing a resin bag according to a first aspect is a method using an insert molding, the resin bag comprising two sheets, i.e. first and second resin sheets which are bonded to each other at least at one portion of the peripheries thereof. The method of manufacturing the resin bag comprises disposing the first resin sheet in a cavity of a mold, overlaying a heat-resisting sheet smaller than the first resin sheet on the first resin sheet to expose the periphery of the first resin sheet along the outer periphery of the heat-resisting sheet, and then injecting resin into the cavity in a state where the mold is opened, closing the mold with pressing and expanding the injected resin in such a manner that the injected resin covers the heat-resisting sheet and the exposed periphery of the first resin sheet, thereby molding the second rein sheet and bonding together the periphery of the second resin sheet and the periphery of the first resin sheet.

A method of manufacturing a resin bag according to a second aspect is a method using an insert molding, the resin bag comprising two sheets, i.e. first and second resin sheets which are bonded to each other at least at one portion of the peripheries thereof. The method of manufacturing the resin bag comprises disposing the first resin sheet in a cavity of a mold, overlaying a heat-resisting sheet, which is smaller than the first resin sheet and having an opening, on the first resin sheet to expose the periphery of the first resin sheet along the outer periphery of the heat-resisting sheet and to expose a portion of the first resin sheet corresponding to the opening of the heat-resisting sheet, then injecting resin into the cavity in a state where the mold is opened, closing the mold with pressing and expanding the injected resin in such a manner that the injected resin covers the heat-resisting sheet and the exposed periphery and the exposed portion, facing the opening, of the first resin sheet, thereby molding the second resin sheet and bonding together the periphery and the portion, facing the opening, of the second resin sheet and the periphery and the portion, facing the opening, of the first resin sheet.

In the above method, the second resin sheet is made of the resin injected into the cavity and the resin adheres the periphery of the first resin sheet not covered by the heat-resisting sheet or the periphery and the portion facing the opening of the heat-resisting sheet. The first resin sheet is covered by the heat-resisting sheet except the periphery or except the periphery and the portion facing the opening so that the covered portion is not in directly contact with the injected resin. Therefore, the resin is bonded to the exposed portions of the first resin sheet.

The resin bag of the present invention is composed of two resin sheets of which peripheries are bonded together and wherein at least one of the resin sheets has a rough surface facing the inside of the bag.

The bag is particularly suitable for an air bag. As at least one of the resin sheets has a rough surface facing the inside of the bag as mentioned above, the sheets are prevented from adhering to each other even when these are overlaid on each other for a long time, thereby preventing the bag from not opening.

BRIEF DESCRIPTION OF THE DRAWINGS

FIGS. 7a and 7b are views for explaining a method of manufacturing a water cushion of Example 5, wherein FIG. 7a is a perspective view showing the arrangement of a first resin sheet and a heat-resisting sheet and FIG. 7b is a sectional view taken along a line VIIB—VIIB of FIG. 7a, and FIGS. 8a and 8b are views for explaining a method of manufacturing an air mat of Example 6, wherein FIG. 8a is a perspective view showing the arrangement of a first resin sheet and a heat-resisting sheet and FIG. 8b is a sectional view taken along a line VIIIB—VIIIB of FIG. 8a.

DESCRIPTION OF THE PREFERRED EMBODIMENTS

Figure 1A:
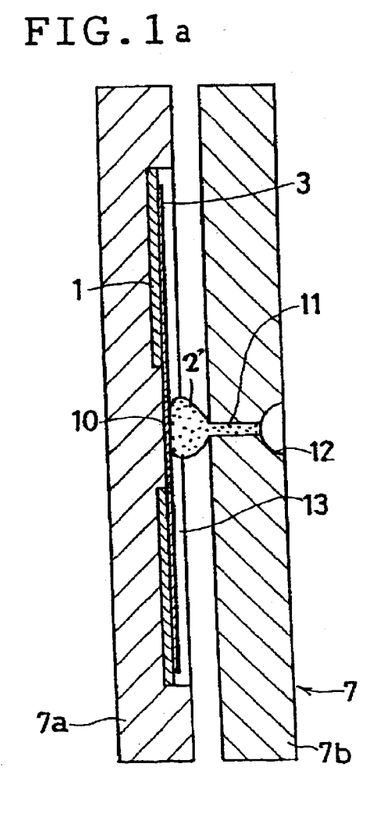
FIGS. 1a and 1b are sectional views of a mold showing a manufacturing process.
Figure 1B:
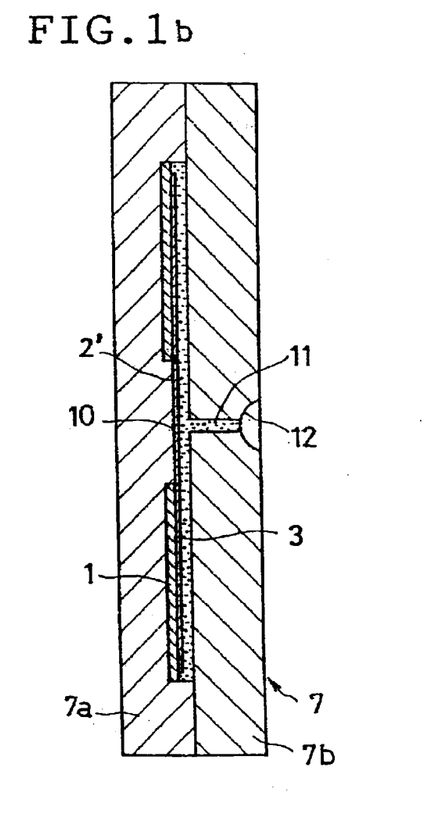
Figure 1C:
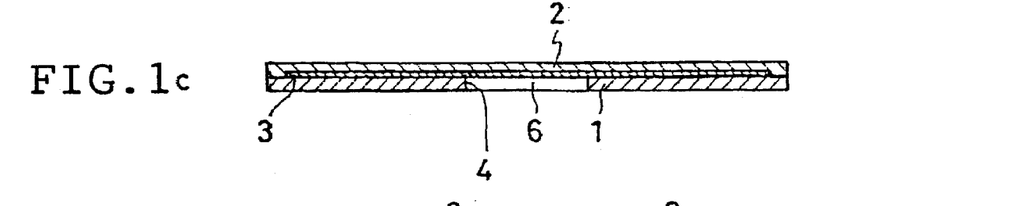
FIGS. 1c and 1d are sectional views of an air bag according to an embodiment of the present invention.
Figure 1D:
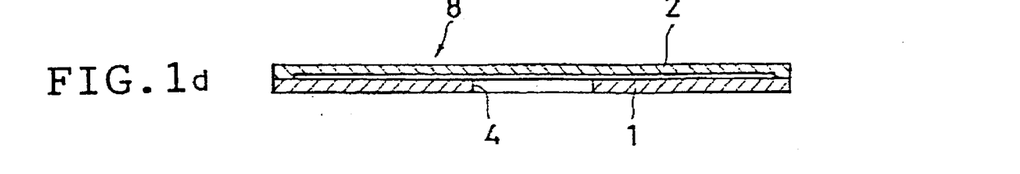
Figure 3:
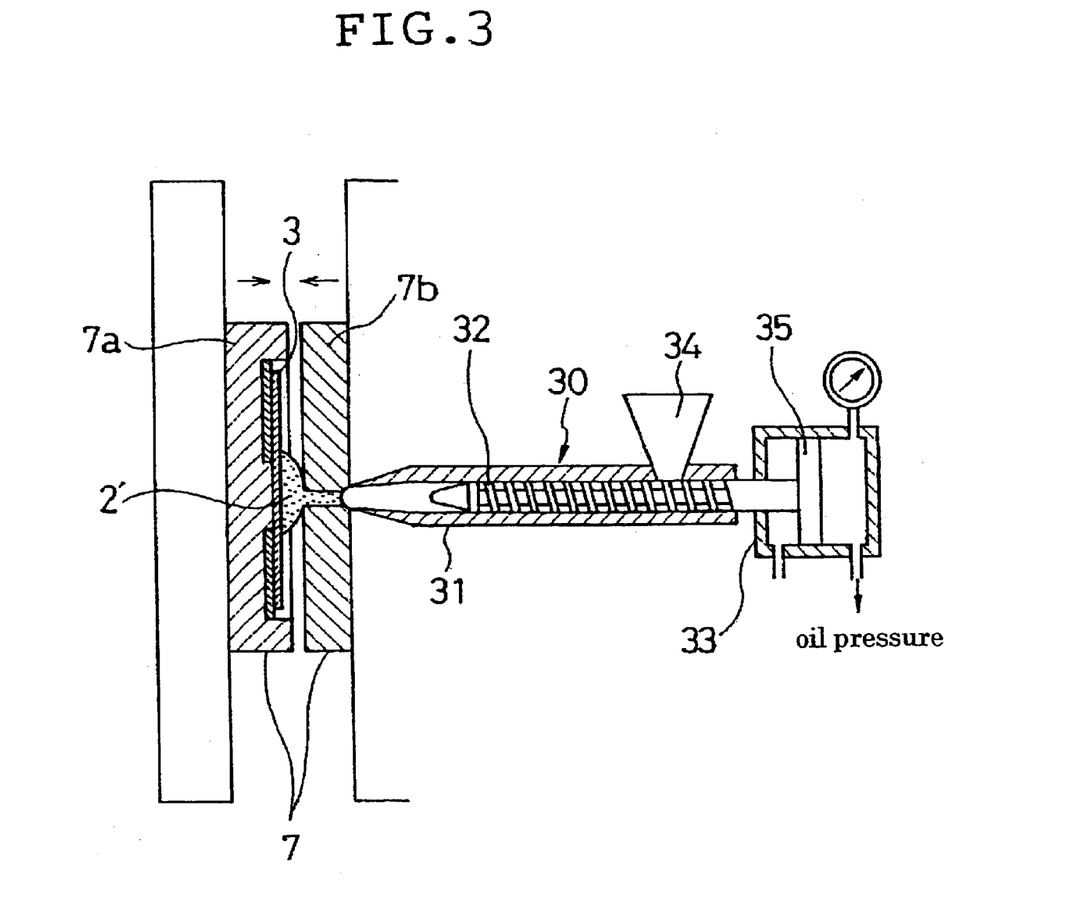
FIG. 3 is a sectional view showing another step of the process of the injection & compression molding.
Figure 4:
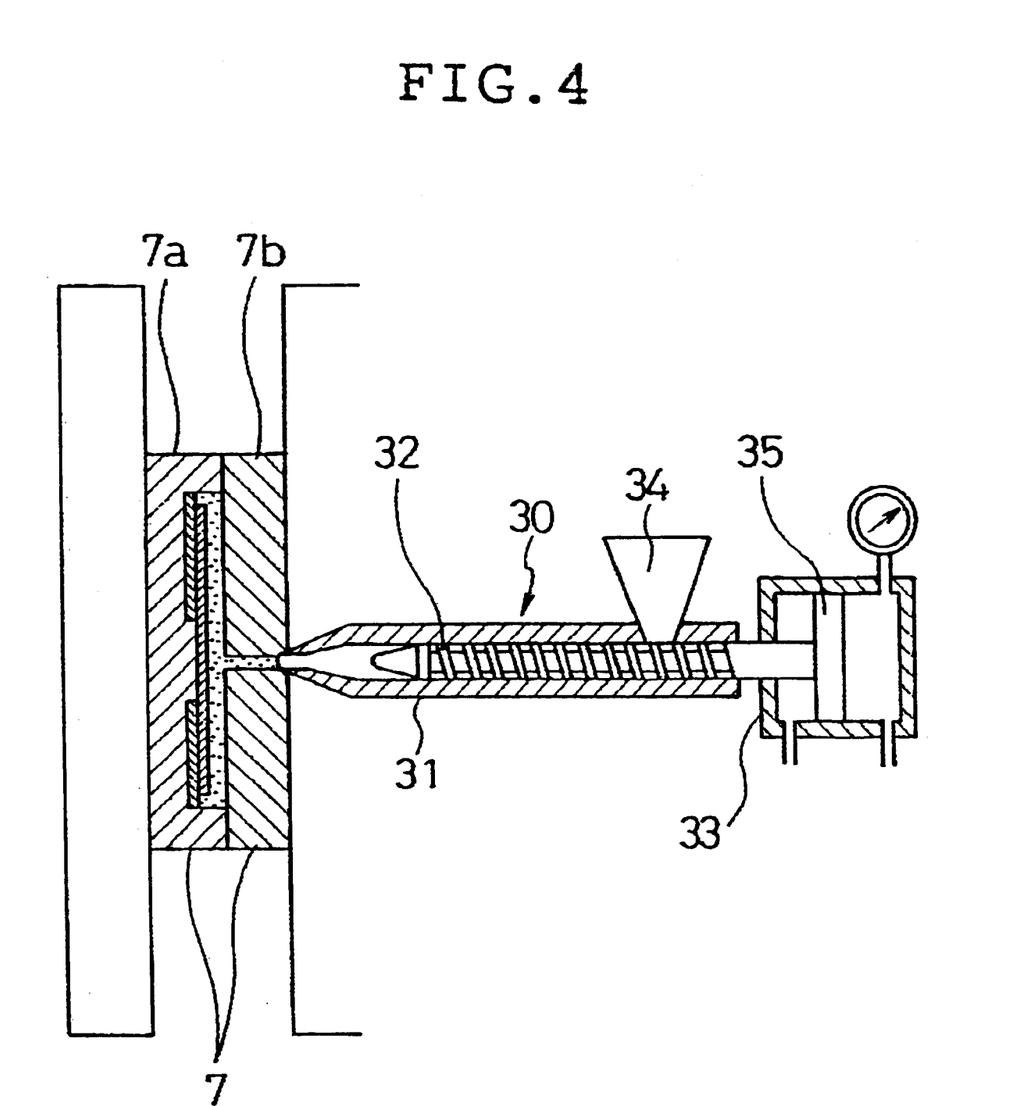
FIG. 4 is a sectional view showing another step of the process of the injection & compression molding.
Figure 5:
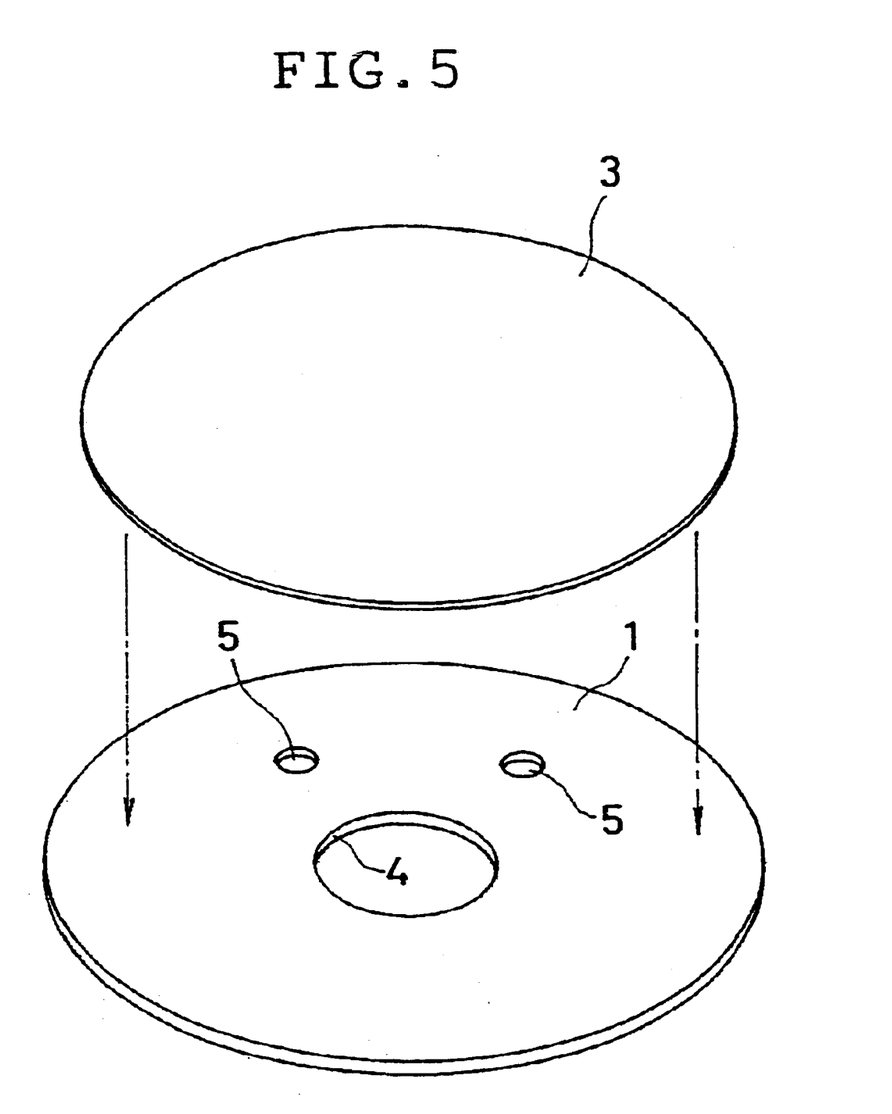
FIG. 5 is a perspective view showing a first resin sheet and a heat-resisting sheet.

Hereinafter, embodiments of the present invention will be described with reference to the attached drawings. FIGS. 1a, 1b, 2, 3, and 4 are sectional views of a resin air bag in the course of the manufacturing process according to an embodiment of the present invention, FIGS. 1c and 1d are sectional views of the air bag as a finished product, and FIG. 5 is a perspective view of a resin sheet and a heat-resisting sheet.

The air bag 8 manufactured by the method of the embodiment comprises a first resin sheet 1 and a second resin sheet 2 which are bonded together around the edges thereof. To manufacture the air bag 8, the first resin sheet 1 is put in a cavity 13 of a mold 7 composed of a mold half 7a and a mold half 7b and the heat-resisting sheet 3 is overlapped on the first resin sheet 1 as shown in FIG. 5. The first resin sheet 1 is provided with an inflator inlet 4 formed therein. The first resin sheet 1 is arranged in such a manner that the inflator inlet 4 engages a convex portion 10 of the mold 7 (the mold half 7a). The resin sheet 1 is also provided with vent holes 5 formed therein.

The mold 7 (the mold half 7b) is provided with a gate 11 and a sprue bush end 12 in opposing relation to the convex portion 10. It should be noted that the number and the arrangement of the gates may be optimally selected depending on the size and configuration of a product to be molded.

Figure 2:
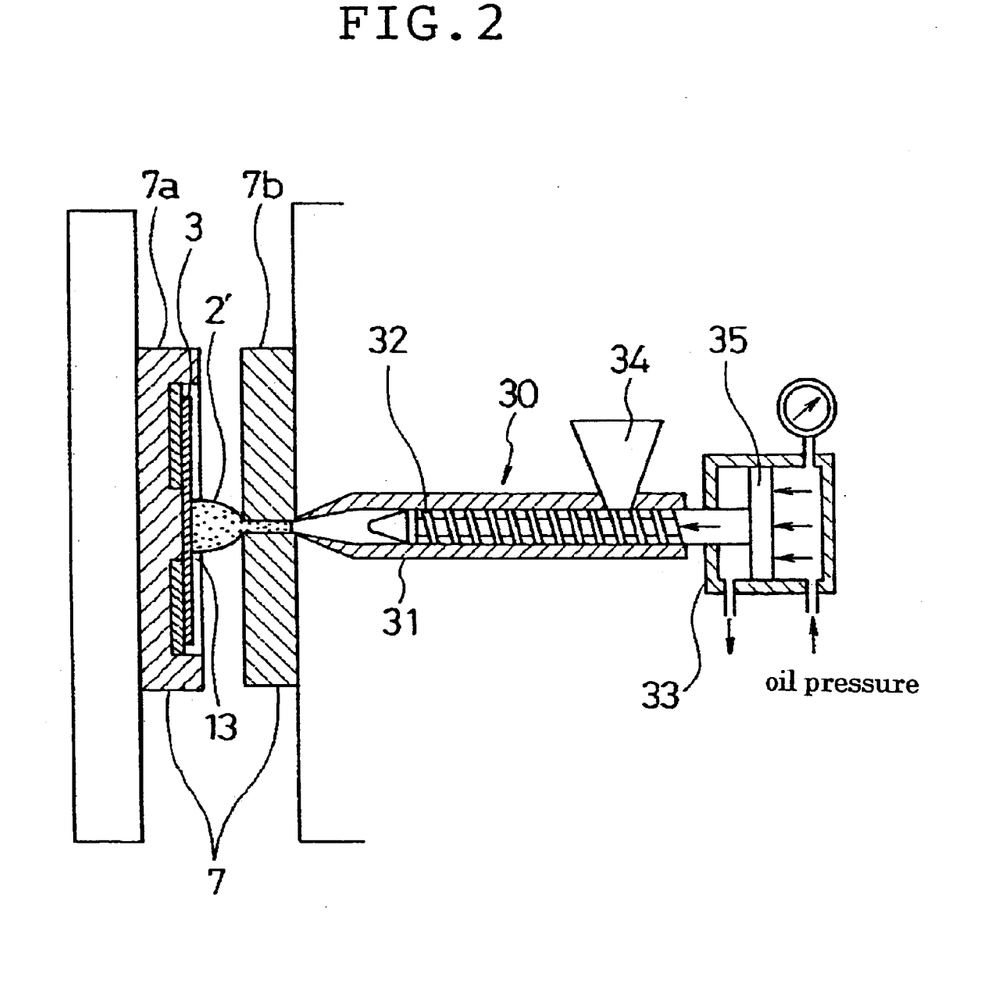
FIG. 2 is a sectional view showing a step of the process of an injection & compression molding.

As shown in FIG. 2, the mold halves 7a, 7b are spaced apart from each other and a nozzle of an injection molding machine 30 is brought in contact with the sprue bush end 12 to inject thermoplastic resin 2' into the cavity 13 through the gate 11. Then, as shown in FIGS. 3 and 4, the thermoplastic resin 2' is compressed by the mold halves 7a, 7b so that the resin 2' is expanded in the cavity 13 to form a second resin sheet 2.

The injection molding machine 30 has a heating cylinder 31 and a screw 32 for measuring and kneading a material in the heating cylinder 31. The screw 32 is moved forward and backward by a hydraulic cylinder 33. While the driving mechanism of the screw 32 is not shown, any one of well-known mechanism may be employed.

Resin pellets as a raw material of the resin 2' are supplied into a heating cylinder 31 from a hopper 34 and the screw 32 is rotated so that the resin pellets are melted, measured, and moved forward. Applying hydraulic pressure on the backface of a piston 35 moves the screw 32 forward to inject the resin 2'.

Since the injected resin 2' has good conformability relative to the first resin sheet, the injected resin 2' and the first resin sheet are bonded together in the cooling process after the injection. However the heat-resisting sheet 3 is not conformable relative to the injected resin 2' so that the injected resin is not bonded to the heat-resisting sheet.

After sufficiently cooling the injected resin, the mold 7 is opened to take off the formed air bag 8. The heat-resisting sheet 3 is removed from the air bag 8 through the inflator inlet 4. It should be noted that in case where the heat-resisting sheet 3 is thin, the heat-resisting sheet may be left as a flame protecting material in the air bag. However, since the heat-resisting sheet 3 is normally formed to have great thickness in order to prevent the heat-resisting sheet 3 from breaking during the injection and compression, the heat-resisting sheet 3 is preferably removed from the air bag after molding. It is also preferable that the removed heat-resisting sheet is reused.

When the bag is molded as shown in FIGS. 2, 3, 4, it is required for molding the second resin sheet 2 with uniform thickness and without distortion to control precisely the fill of the resin 2' every shot.

In case where the fill of the resin 2' is too much, the resin 2' is overcharged in the cavity 13 when the injected resin 2' is compressed and expanded and the mold 7 is closed, thereby causing distortion on the second resin sheet 2. Since the first sheet 1 inserted is made of resin, the first sheet 1 has elasticity greater than that of metal. Especially when the resin is elastomer, the second sheet is formed with the first resin sheet being deformed by the pressures developed for closing the mold. That is, the pressures exerted inside the cavity 13 differ from place to place and this non-uniform state is fixed, thereby causing non-uniform thickness of the second sheet 2 and changing the object character of the sheet 2 with respect to the location.

On the other hand, when the fill of the resin 2' is insufficient, the result is the short-shot.

In the above circumstances, it is required to always keep the suitable fill of the resin 2'. Since, in practice, the temperature of the heating cylinder changes and the residence time of the resin 2' shifts so that the viscosity of the resin 2' is varied, the measurement of the resin by the screw is influenced. There are also many other factors that influence the fill of the resin, for example, that the temperature of the mold 7 or the distribution thereof, thus varying the flow of the resin 2' in the mold 7.

In order to overcome the over and short of the fill, the variation and ununiformity of the inner pressure of the cavity, and the distortion of the first resin sheet 1 and thus to provide the second resin sheet 2 with uniform thickness and without distortion, a mechanism of only overflowing the resin after closing the mold when the excess resin is filled in the cavity is insufficient. The effective way for overcoming this problem is that the molding machine is provided with an apparatus which lets the excess resin to escape when the mold is closed or supplies resin for the insufficiency of resin.

The apparatus detects that the resin is filled throughout the cavity 13 even to the ends thereof or that the pressure in the cavity 13 reaches a predetermined value, and controls the backpressure of the piston 35 to lower the inner pressure of the cavity and returns the excess resin within the cavity 13 to the cylinder 31, thereby preventing the overcharge. Alternatively, the fill of the resin 2' is set to be little too much in order to prevent the short-shot. In this case, the apparatus detects that the mold 7 is completely closed and lowers the backpressure of the piston 35 to return the excess resin to the cylinder 31, thereby also preventing the overcharge.

On the other hand, when the inner pressure of the cavity when the mold 7 is completely closed does not reach the predetermined value or when the resin 2' is not filled throughout the cavity especially in the ends thereof, i.e. in case of short-shot, a mechanism of filling the resin 2' until reaching the predetermined value or to the ends of the cavity 13, i.e. controlling the piston 35 to further inject the resin 2', is provided, thereby preventing the short-shot of the resin 2'.

Therefore, the second sheet 2 is formed with a uniform thickness and without distortion.

While the means of detecting that the mold 7 is completely closed may be a photocell or a limit switch, the means of detecting the inner pressure of the cavity may be a pressure sensor, and the means of detecting that the resin 2' is filled throughout the cavity especially in the ends thereof may be a temperature sensor or a pressure sensor, these may be any sensor known by one of skill in the art. Controlling the backpressure of the piston 35 by electric signal from the above sensor is easily implemented by a hydraulic control generally well known.

In the embodiment of FIG. 1, the first sheet 1 is dimensioned such that the peripheral edge of the first sheet 1 is in contact with the inner surface of the cavity 13. Therefore, the second resin sheet 2 is bonded only to an upper surface of the peripheral portion of the first resin sheet 1. However, the diameter of the cavity 13 may be larger than that of the first resin sheet 1 and the second resin sheet 2 may cover the peripheral edge of the first resin sheet 1.

Figure 6A:
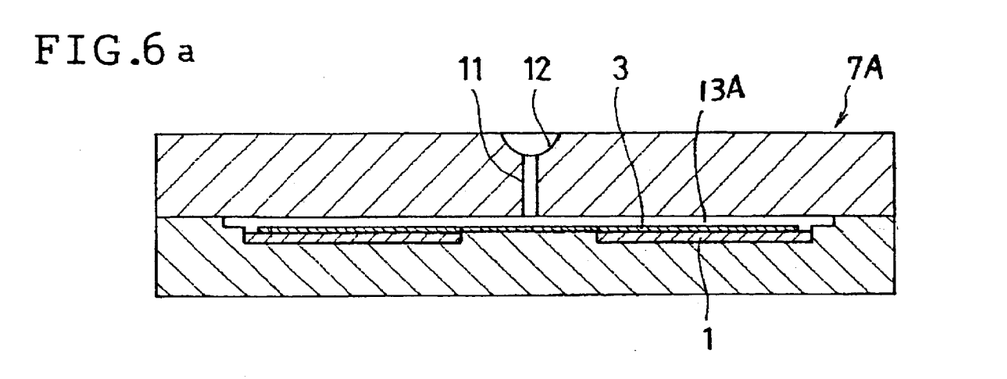
FIG. 6a is a sectional view of a mold.
Figure 6B:
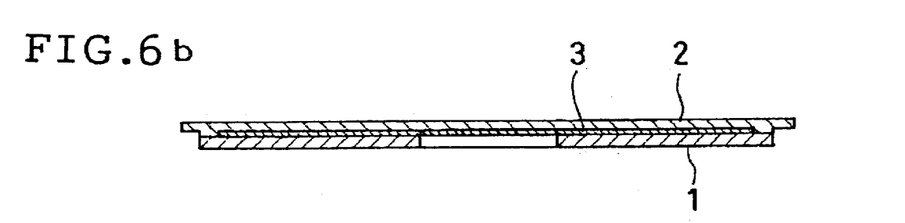
FIGS. 6b and 6c are sectional views of an air bag according to another embodiment of the present invention.
Figure 6C:
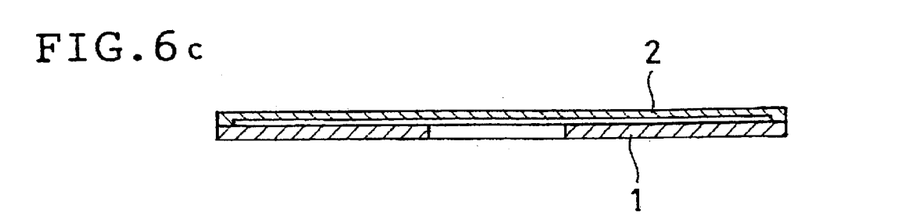

FIGS. 6a, 6b, 6c show another embodiment of the present invention, FIG. 6a is a sectional view of a mold and FIGS. 6b and 6c are sectional views of a formed air bag.

In this mold 7A, a cavity 13A for molding a second resin sheet has a larger diameter than that of the first resin sheet 1. Therefore, the second resin sheet 2 extends outwardly than the first resin sheet 1 as shown in FIG. 6b just after removed from the mold. After that, the extending portion of the second resin sheet 2 is cut off to make an air bag product as shown in FIG. 6c.

Since the second resin sheet 2 is formed in a little larger space for molding the second resin sheet, the first resin sheet 1 can be covered by the resin 2' when the resin 2' is still in sufficiently high temperature so as to have high fluidity, thereby rigidly bonding the resin sheets 1 and 2 on each other.

In the present invention, the resin may be selected from various thermoplastic resins suitably for the purpose of the product, and for example, general purpose resins such as vinyl chloride, polyethylene, and polypropylene may be employed. While the combination of resins for the first resin sheet and the second resin sheet may be selected from any combination which satisfies the bonding therebetween, it is preferable to select the same resin. Concretely, a synthetic resin of thermoplastic elastomer, especially thermoplastic polyurethane, is preferable for air bags. After-crosslinking thermoplastic polyurethane may be employed as the resin. In this case, dimers such as polyhydric alcohol, polyhydric amine, TDI (toluylene-di-isocyanate) are preferably used as a crosslinking agent. The ratio of the crosslinking agent is preferably 5 –0.5 weight %, more preferably 3 –1 weight % relative to the resin. In case where an after-crosslinking resin is employed and crosslinked after the molding, the heating is preferably performed at temperature of 50–120° C.

It is especially preferable that the first resin sheet 1 is made of an after-crosslinking resin and, after molding the air bag, the first and second resin sheets 1 and 2 are heated together so as to crosslink the resin sheets 1 and 2, thereby extremely rigidly bonding the resin sheets 1 and 2 on each other. It should be understood that the first resin sheet may be previously heated and crosslinked.

The material for the heat-resisting sheet 3 is preferably a silicone-coated nylon fabric, a silicone-coated polyester fabric, or a glass fiber reinforced fluorocarbon resin (e.g. PTFE) or silicone-coated aromatic polyamide fabric. Among them, particularly the aromatic polyamide fabric coated with silicone resin is preferable in view of durability, and the polyester fabric coated with silicone resin is preferable in view of cost.

In case where the heat-resisting sheet is made of a fiber reinforced fabric coated with silicone resin or fluorocarbon resin, the sheet has weave textures raised from the surface of the sheet. That is, the surface of the heat-resisting sheet has concavities and convexities.

When the air bag is molded in such a manner that the resin 2' comes in contact with the surface of the heat-resisting sheet having the concavities and convexities, the concavities and convexities are transferred to the inner surface of the second resin sheet 2 so that concavities and convexities are formed on the inner surface of the sheet 2. Such concavities and convexities prevent the first resin sheet 1 and the second resin sheet 2 from adhering to each other even when these are overlaid on each other for a long time (e.g. several years). As a gas is supplied to the inside of the air bag, the air bag is rapidly inflated. The concavities and convexities are preferably formed in such a manner that the distance between the adjacent convexities is 0.5–3 mm, especially 1–2 mm, and that the vertical distance between the bottom of the concavity and the top of the convexity is $1/100$–$5/100$ mm, especially $1/100$ mm–$3/100$ mm. The concavities and convexities of the heat-resisting sheet may be formed by a mold with concavities and convexities when the heat-resisting sheet is molded.

While the heat-resisting sheet 3 is a circular sheet in the embodiment shown in FIGS. 1 through 4, the heat-resisting sheet may be provided with an opening in the center thereof which the convex portion 10 of the mold 7 engages, thereby preventing the misalignment of the heat-resisting sheet. In this case, however, there is a possibility that the injected resin enters through a slight gap between the heat-resisting sheet and the convex portion of the mold so that the first resin sheet and the second resin sheet are bonded together at undesired position too. Therefore, in case of manufacturing the resin bag in which the first resin sheet and the second resin sheet are bonded together only at the peripheries thereof, it is preferable that the heat-resisting sheet is not provided with the opening.

The heat-resisting sheet may be removed from the resin bag after molding the resin bag or may be left as a flame protecting material in the air bag. In the case removing the heat-resisting sheet, however, the formed resin bag should have an opening for removing the heat-resisting sheet or it is required to form the opening. It is also required that the heat-reissuing sheet has flexibility sufficient for allowing the heat-resisting sheet to be easily removed through the opening.

While the above embodiments relate to a driver-side air bag, the present invention can be applied to an air bag for an occupant in a passenger seat or a rear seat. The present invention can be also applied to bags such as a water pillow, a float, an air mat and a life jacket.

When the present invention is applied to an air mat or a life jacket, a sheet smaller than the first resin sheet and having an opening is employed as the heat-resisting sheet, whereby the first resin sheet and the second resin sheet are bonded together at portions facing the opening besides the peripheries thereof. Therefore, the inside of the formed resin bag is divided into a plurality of sections with air paths.

The first and second resin sheets of the present invention may be made of composite material in order to reinforce the resin sheets or improve the appearance thereof. The composite material sheet, which is made by extruding resin with a woven fabric, vacuum molding, bonding, or including a woven fabric as an insert and molding resin on the woven fabric by an injection & compression molding like a method disclosed in this invention, may be employed as the first resin sheet. To make the second resin sheet with the composite material, a base material to be composed is used in place of the heat-resisting sheet. As shown in FIG. 1, a base material to be composed, which is smaller than a first composite resin sheet, is overlaid on the first composite resin sheet disposed in the cavity of mold and then resin is injected and compressed on the base material to mold the second resin sheet in such a manner that the base material is composed with the second resin sheet while the first composite resin sheet and the second resin sheet are bonded together at the peripheries thereof.

The base material to be composed with the second resin sheet is not always required to be coated with silicone or fluorocarbon resin as the heat-resisting sheet mentioned above. When the injected melt resin passes through the base material so that the base material adheres the first resin sheet, the base material is coated with heat-resisting and noncohesive resin, is disposed in such a manner that the coated surface faces to the first resin sheet and the non-coated surface faces to the second resin sheet, and is composed. When the base material has sufficient heat resistance relative to the melt resin and a density not allowing the melt resin to pass through the base material, the base material is not required to be coated with the heat-resisting resin such as silicone and fluorocarbon resin.

To improve the bonding strength between the base material and the applied resin, adhesives and/or agent may be applied to the base material. Since the suitable adhesives and the processing agent differ depending on the combination of the base material and resin, the adhesives and the processing agent may be selected appropriately. For example, when the base material is a nylon fabric and the applied resin is thermoplastic polyurethane, urethane adhesives are applied on one side of the base material.

According to the present invention, the first resin sheet may be previously formed and disposed in the mold or may be molded by using the mold. In the latter case, a combination of mold halves 7a and 7c (7c is not shown) is also used besides the combination of the mold halves 7a and 7b. The mold halves 7a and 7c are used for molding the first resin sheet. After molding the first resin sheet by using the mold halves 7a and 7c, the mold half 7c is exchanged with the mold half 7b. After that, the second resin sheet is mold to manufacture the bag as mentioned above.

EXAMPLE 1

After adding dimers of TDI as a crosslinking agent to after-crosslinking thermoplastic polyurethane resin (Pandex T-8190N available from Dainihon-Inki-Kagakukogyou) in the ratio of 1 to 100 by weight and mixing them, the mixture was supplied into a hopper of the injection molding machine 30 and molded at cylinder temperatures of 220/210/185/130° C. and a nozzle temperature of 230° C.

An air bag was made by using the mold 7 and according to the process shown in FIGS. 1 through 4. A first resin sheet which was made of thermoplastic polyurethane of the same composition and crosslinked at 100° C. for 12 hours and wherein the diameter is 348 mm and the inner diameter is 87 mm was used as the first resin sheet 1.

An aromatic polyamide fabric (METSUKE 220 $g/m^2$) which was coated with silicone rubber at a ratio 100 $g/m^2$ and has the thickness of 0.3 mm and the diameter is 338 mm was employed as the heat-resisting sheet 3.

The mold opening between the mold halves 7a, 7b was set to 10 mm. After injecting 70 g of the resin 2', the mold halves 7a and 7b were moved closer to each other with a speed of 10 mm/sec, whereby the second resin sheet 2 was molded. After that, the molding was removed from the mold 7 and crosslinked at 100° C. for 12 hours, and then the heat-resisting sheet 3 was removed from the bag. In this way, the air bag 8 is manufactured.

The thickness of the resin sheet 1 was 0.6 mm. The tensile strength of the sheets 1, 2 after the crosslinking was 470 $kg/cm^2$ in the radial direction of the air bag and 476 $kg/cm^2$ in the circumferential direction of the air bag. The tensile expansion was 635% in the radial direction of the air bag and 631% in the circumferential direction of the air bag.

The bonded width between the resin sheets 1 and 2 was 5 mm. In this case, the peel strength between the sheets 1 and 2 was 3.8 kg/cm on average.

The thickness of the second resin sheet 2 was 0.6 mm on average and the standard deviation was 0.07 mm.

EXAMPLE 2

An air bag was made in the same manner as the example 1 but employing an after-crosslinking resin, not crosslinked yet, as the first resin sheet. In this example, the measured peel strength between the sheets 1 and 2 was 7.9 kg/cm on average. As a result, it was found that employing the not-crosslinked resin also for the first resin sheet doubled the peel strength or more.

EXAMPLE 3

An air bag was made in the same manner as the example 1 but forming the second resin sheet to have diameter of 400 mm larger than that of the first resin sheet as shown in FIG. 6 and, after that, cutting off the extending portion of the second resin sheet 2. In this example, the measured peel strength was 7.9 kg/cm on average. It was found that the peel strength was significantly increased.

EXAMPLE 4

An air bag was made in the same manner as the example 1 but setting the backpressure exerted on the piston 35 when pressurizing the resin 2' to 0. In this example, the thickness of the second resin sheet 2 was 0.6 mm on average and the standard deviation was 0.03 mm. It was found that the thickness was significantly uniformed. The peel strength between the sheets 1 and 2 was 3.8 kg/cm.

EXAMPLE 5

Figure 7A:
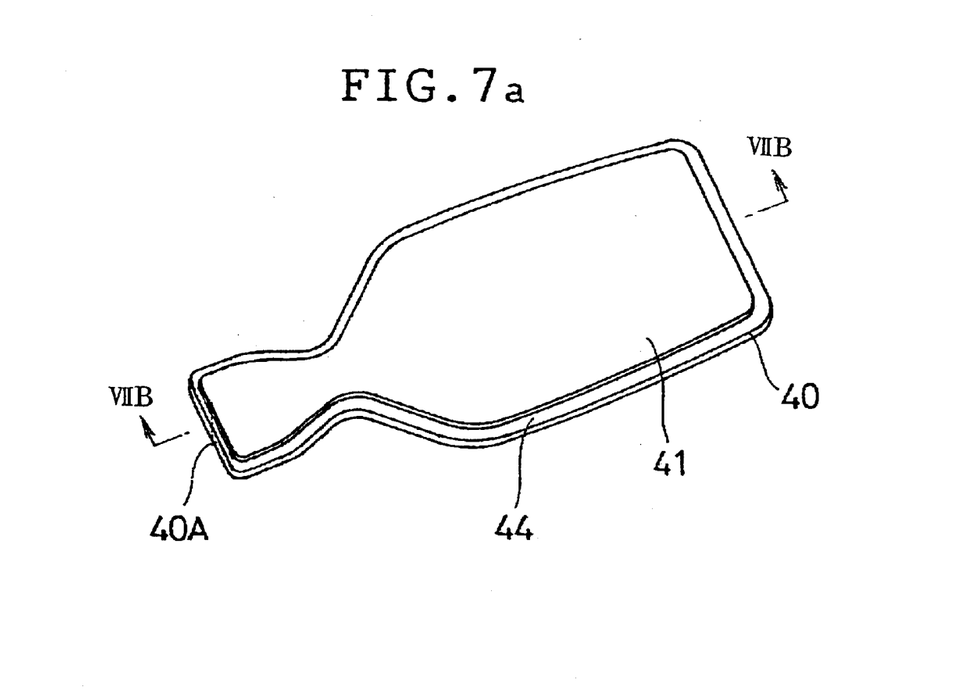
Figure 7B:
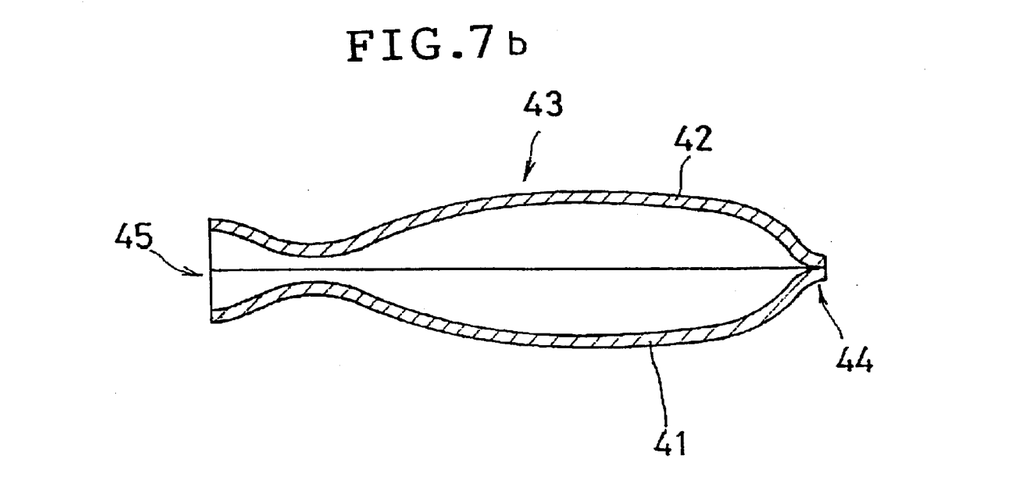

A first resin sheet (a vinyl chloride resin sheet of which thickness was 0.3 mm) 40 in the configuration shown in FIG. 7a and a heat-resisting sheet 41 were disposed in a cavity of a mold, vinyl chloride resin was injected in the same manner as the example 1 to form a second resin sheet 42 of which thickness was 0.3 mm and to bond the first resin sheet 40 and the second resin sheet 42 and, after that, the heat-resisting sheet 41 was removed from the molding. In this way, a water pillow in the configuration shown in FIG. 7b was made.

A glass fiber fabric coated with Teflon was employed as the heat-resisting sheet 41. The heat-resisting sheet 41 was smaller than the first resin sheet 40 by the width of a bonding portion 44 all around the first resin sheet 40 except one side 40A where a bonding portion was not formed and an opening 45 was thus formed. The heat-resisting sheet 41 was removed through this opening 45 after molding.

EXAMPLE 6

Figure 8A:
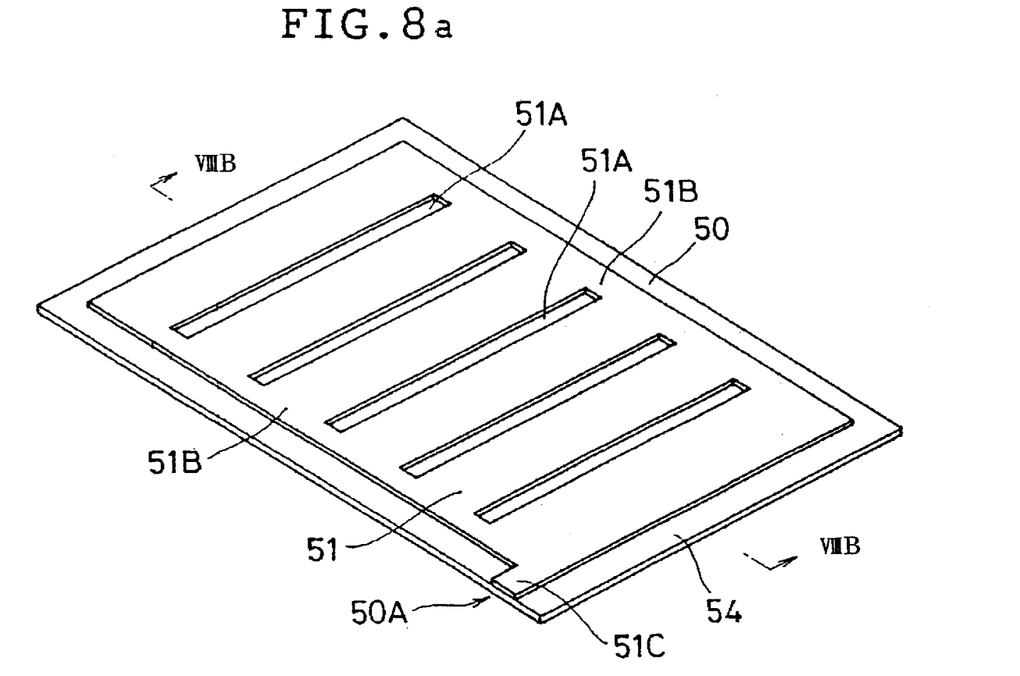
Figure 8B:
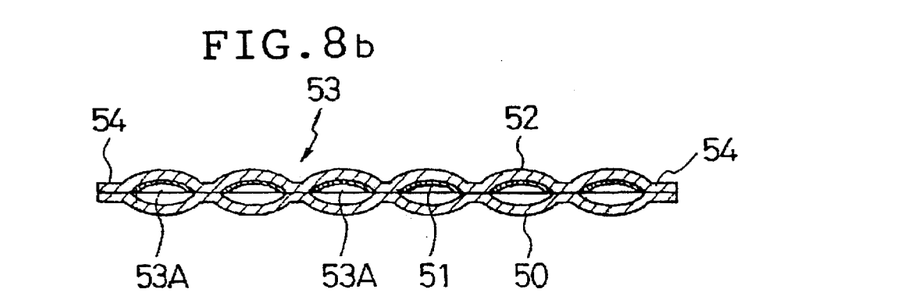

A first resin sheet (a polyester sheet extruded together with urethane of which thickness was 0.6 mm) 50 in the configuration shown in FIG. 8a was disposed in such a manner that an urethane surface thereof faced up and a heat-resisting sheet 51 was disposed on the first resin sheet 50. These were disposed in a cavity of a mold and urethane resin was injected in the same manner as the example 1 to form a second resin sheet 52 of which thickness was 0.4 mm and to bond the first resin sheet 50 and the second resin sheet 52. After that, these were annealed at 100° C. for 6 hours. In this way, an air mat 53 in the configuration shown in FIG. 8b was made. The heat-resisting sheet 51 was polyester fiber fabric of which an upper surface was coated with urethane adhesives so that the heat-resisting sheet 51 was integrated with the second resin sheet 52 to function as a reinforcement.

The heat-resisting sheet 51 was smaller than the first resin sheet 50 by the width of a bonding portion 54 all around the first resin sheet 50 except one side 50A and was provided with five slit-like openings 51A formed therein. The first resin sheet 50 and the second resin sheet 52 are bonded to each other at portions corresponding to the openings 51A and the periphery except the side 50A. Therefore, air paths (corresponding to 5B of FIG. 8*a*), an opening (corresponding to 51C of FIG. 8*a*), and six air chambers 53A were formed in the air mat 53.

As mentioned above, according to the manufacturing method of the resin bag of the present invention, the periphery of the first resin sheet and the periphery of the second resin sheet can be bonded together by injection molding of the second resin sheet, thereby extremely facilitating the manufacture of bags of various types. The bag manufactured by the method of the present invention can have a bonding portion with quite high bonding strength and without being bulky, thereby reducing the volume of the air bag in the folded state.

In the bag of the present invention, the first resin sheet and the second resin sheet do not adhere to each other even when these are overlaid on each other for a long time. The bag can be quickly inflated when a gas is supplied inside the bag.

I claim:

1. A resin bag comprising:

two resin sheets having peripheries bonded together to form the bag and inner surfaces facing each other in the bag, and at least one rough surface formed on one of the inner surfaces of the two resin sheets, said at least one rough surface including concavities and convexities so that a lateral distance between adjacent convexities is 0.5–3 mm and a vertical distance between a bottom of one concavity and a top of the convexity is $1/100$–$5/100$ mm to prevent the two resin sheets from adhering to each other when the two resin sheets are overlaid.

2. A resin bag according to claim 1, wherein said concavities and convexities constituting the at least one rough surface are formed integrally with one of the two resin sheets forming the resin bag as parts thereof.

3. A resin bag according to claim 2, wherein the lateral distance is 1–2 mm, and the vertical distance is $1/100$–$3/100$ mm.

4. A resin bag according to claim 2, wherein said resin sheets form an air bag.

5. A resin bag according to claim 4, wherein said resin bag is formed of a first sheet having a center opening for providing gas to the resin bag, and a second sheet laminated with the first sheet and having said rough surface on the inner surface thereof.

* * * * *